(12) United States Patent
Viers (10) Patent No.: US 7,263,988 B2
(45) Date of Patent: Sep. 4, 2007

(54) PORTABLE GRILL

(76) Inventor: Mark A. Viers, 3699 Rosewood La., Rochester Hills, MI (US) 48307

( * ) Notice: Subject to any disclaimer, the term of this patent is extended or adjusted under 35 U.S.C. 154(b) by 70 days.

(21) Appl. No.: 10/937,544

(22) Filed: Sep. 9, 2004

(65) Prior Publication Data

US 2006/0048766 A1    Mar. 9, 2006

(51) Int. Cl.
*F24B 3/00* (2006.01)
(52) U.S. Cl. ............... 126/25 A; 126/25 AA; 126/9 R
(58) Field of Classification Search ......... 126/25 R, 126/25 AA, 25 A, 29, 30, 26, 9 R, 37 B, 126/304 A; 248/130, 163.2, 440, 178.1, 248/188.2, 161, 176.2
See application file for complete search history.

(56) References Cited

U.S. PATENT DOCUMENTS

| | | | |
|---|---|---|---|
| 315,846 A | 4/1885 | Seibert | |
| 366,833 A | 7/1887 | Hipwell | |
| 690,150 A * | 12/1901 | Inman | 254/131 |
| 695,465 A * | 3/1902 | Lyman | 248/371 |
| 832,163 A * | 10/1906 | Ruger | 248/165 |
| 955,140 A | 4/1910 | Cronk | |
| 2,466,496 A | 4/1949 | Smith | |
| 3,043,209 A | 7/1962 | Sutherland et al. | |
| 3,498,210 A | 3/1970 | O'Toole | |
| 4,024,851 A | 5/1977 | Boda | |
| 4,120,280 A | 10/1978 | Iverson et al. | |
| 4,146,010 A * | 3/1979 | Manska | 126/30 |
| 4,363,313 A | 12/1982 | Smith | |
| 4,732,138 A * | 3/1988 | Vos | 126/25 A |
| 5,713,344 A | 2/1998 | Gilbert | |

* cited by examiner

*Primary Examiner*—Josiah Cocks
*Assistant Examiner*—Sarah E. Suereth
(74) *Attorney, Agent, or Firm*—VanOphem & VanOphem, P.C.

(57) ABSTRACT

A portable grill apparatus including a frame having a plurality of leg members pivotally attached to a support rod. An arm member is also pivotally attached to the support rod and extends outwardly therefrom on both sides of the support rod. A pair of rail members is suspended from the arm member. A firebox is supported by the rail members such that the rail members and correspondingly the firebox are suspended above the ground surface. The arm member pivots on the support rod to adjust the orientation of the rail members and correspondingly the firebox.

17 Claims, 6 Drawing Sheets

PORTABLE GRILL

CROSS-REFERENCE TO RELATED APPLICATIONS

Not Applicable

BACKGROUND OF THE INVENTION

1. Field of the Invention

The present invention relates generally to a portable grill. More specifically, this invention is directed to a portable, self contained grill assembly having an adjustability feature enabling the grill to remain horizontal when used on uneven terrain.

2. Description of Related Art

Since the dawn of man, people have been cooking over a campfire. The lure of the great outdoors is still strong. Today many people welcome the opportunity to escape to nature and cook over an open fire. Consequently, many devices have been developed over the years that support cooking utensils or grills over a campfire. Generally, such devices utilize some type of frame assembly erected over a campfire from which a cooking utensil or grill is suspended.

Tripod stands or systems for supporting a grill or other cooking platform or utensil over an open fire on the ground have existed for many years. See for example: U.S. Pat. Nos. 366,833; 2,466,496; 3,043,209; and 4,120,280. These stands typically include at least three legs connected at one end thereof to form an apex. A support element, typically a flexible wire or chain is used to suspend a grill from the apex of the stand. In many cases, a detent element, such as a cable hook, is attached at the opposite end of the support element and engages one of the legs of the stand. The cable hook slides along the leg and is used to position; i.e., raise and lower the grill, with respect to the fire on the ground to achieve a desired cooking height. These tripod stands or systems by virtue of gravity hang straight down whereby the grill surface is level. One problem encountered with such systems is that adjustability depends upon the size or overall diameter of the grill surface and the length of the tripod legs. In addition, it also depends upon the ground surface or terrain upon which the tripod system is placed. For instance, if the ground surface or terrain is uneven or has too great a slope, the grill or cooking surface will swing to one side and contact one of the legs. Contact with one of the legs usually prevents the grill or cooking surface from hanging level and in some instances prevents adjustability.

In addition, there are many portable cooking devices which use fire shields or self contained fire pits or fireboxes positioned adjacent or near the grill or cooking surface. For instance, U.S. Pat. No. 4,363,313 discloses a portable campfire fireplace having a collapsible firebox defining an area in which a campfire can be built. The firebox helps to contain the campfire. The campfire is still built on the ground surface and is simply contained by the firebox. A similar arrangement is shown in U.S. Pat. No. Des. 315,846, wherein a collapsible circular fire shield is shown disposed below a grill suspended from a tripod stand or system. Both devices require that the fire is built on the ground.

Most camping areas or recreational parks expressly prohibit building a campfire or cooking fire on the ground in any area other than specific areas designated by pre-located fire pits. These fire pits vary in size and design. Accordingly, it is sometimes difficult to properly position a grill structure over the fire pit. Additionally, the fire pit is not always located in the most convenient spot for cooking. Finally, some camping areas or recreational parks expressly forbid any type of fire on the ground surface. In order to provide portability and convenience, many grill assemblies now utilize a fire bowl or firebox as part of the assembly. U.S. Pat. No. 4,732,138 illustrates one type of such an assembly wherein a tripod assembly for supporting a grill or cooking surface is attached to a fire bowl. The fire bowl includes a plurality of nonadjustable leg members used to support it on the ground surface. Thus, while the grill or cooking surface suspended from the tripod frame will remain level, the fire bowl is susceptible to variations in the ground surface.

In addition to the prior art set forth above, several apparatuses have been designed with the issue of portability in mind. U.S. Pat. No. 955,140 discloses a camping apparatus including a supporting tripod formed of telescoping legs that collapse and fit inside sections of a flue for portability purposes. The apparatus further includes a fire shield formed of a plurality of sidewalls pivotally connected together so that they may be folded up. This apparatus still requires that the fire be built on the ground surface. Further, U.S. Pat. No. 4,024,851 discloses a tripod arrangement wherein a grill is suspended from the tripod apex to provide a cooking surface. One of the tripod legs is larger in diameter than the others and is adapted to receive all the other components of the device for storage and thus provide for portability. U.S. Pat. No. 5,713,344 discloses a portable cooking grill slidably mounted on support elements, specifically a series of rods driven into the ground. The grill surface and associated collapsible fire shield panels slide up and down the support elements to position the grill with respect to the fire. In each of these instances, the fire is made on the ground surface.

U.S. Pat. No. 3,498,210 discloses a firebox and a grate-type grill mounted in a cantilevered manner on a support post. The post includes outwardly extending legs that brace the post and correspondingly support the weight of the cantilevered firebox.

From the above, it can be appreciated that portable grills of the prior art are not fully optimized to provide a portable grill apparatus having adjustability to maintain the orientation of the grill or cooking surface. In addition, these grills typically fail to provide a means for containing the fire such that the fire is not built directly on the ground surface. Therefore, what is needed is a portable grill that maintains the orientation of the grill or cooking surface when placed on uneven terrain and if necessary may include a firebox that contains and supports a cooking fire above the ground surface.

SUMMARY OF THE INVENTION

According to the preferred embodiment of the present invention, there is provided a portable grill including a support rod, a plurality of leg members, arm members and a pair of rail members suspended by suspension members from the arm members. The leg members are pivotally attached to the support rod and move independently of one another. The arm members are also pivotally attached to the support rod and pivot as necessary to adjust the orientation of the rail members.

Thus, it is an object of the present invention to provide a portable grill structure capable of supporting and adjusting the orientation of a grill or firebox supported on the rail members.

It is another object to provide a portable grill structure suitable for use on unlevel or uneven terrain.

It is yet another object to provide a portable grill structure that is adjustable to allow fore and aft as well as side to side adjustment of the grill or firebox to maintain a horizontal orientation.

These objects and other features, aspects and advantages of this invention will be more apparent after a reading of the following detailed description, appended claims and accompanying drawings.

DETAILED DESCRIPTION OF THE PREFERRED EMBODIMENTS

Figure 1:
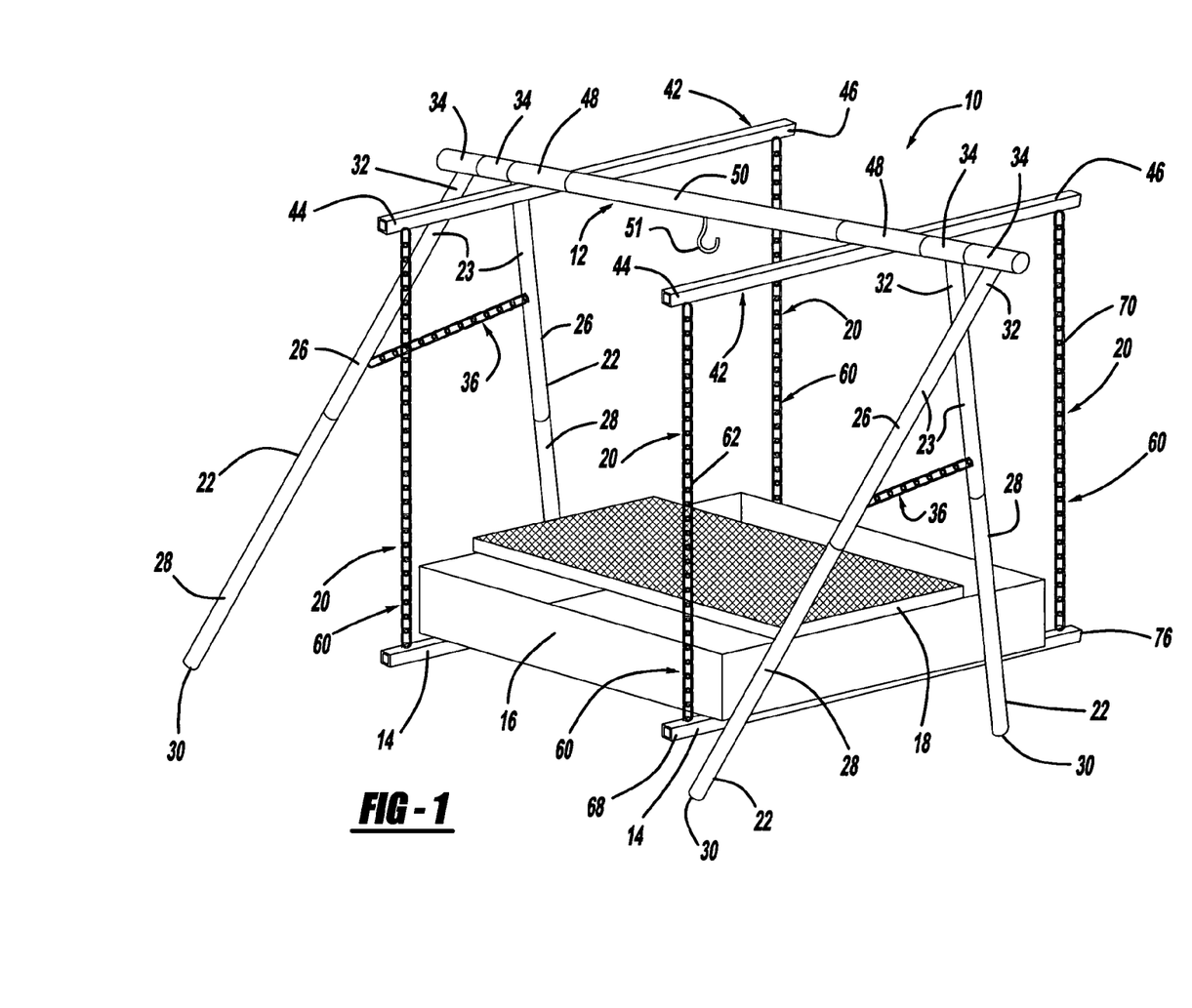
FIG. 1 is a perspective view of a portable grill apparatus according to the preferred embodiment of the present invention.

Referring now in detail to the figures, there is shown prospectively in FIG. 1 a portable grill apparatus, illustrated generally at 10, according to the preferred embodiment of the present invention. The portable grill apparatus 10 generally includes a frame, illustrated generally at 12, a pair of rail members 14, a firebox 16 and a grill 18. As shown, the rail members 14 are suspended from the frame 12 by suspension members 20.

Figure 4:
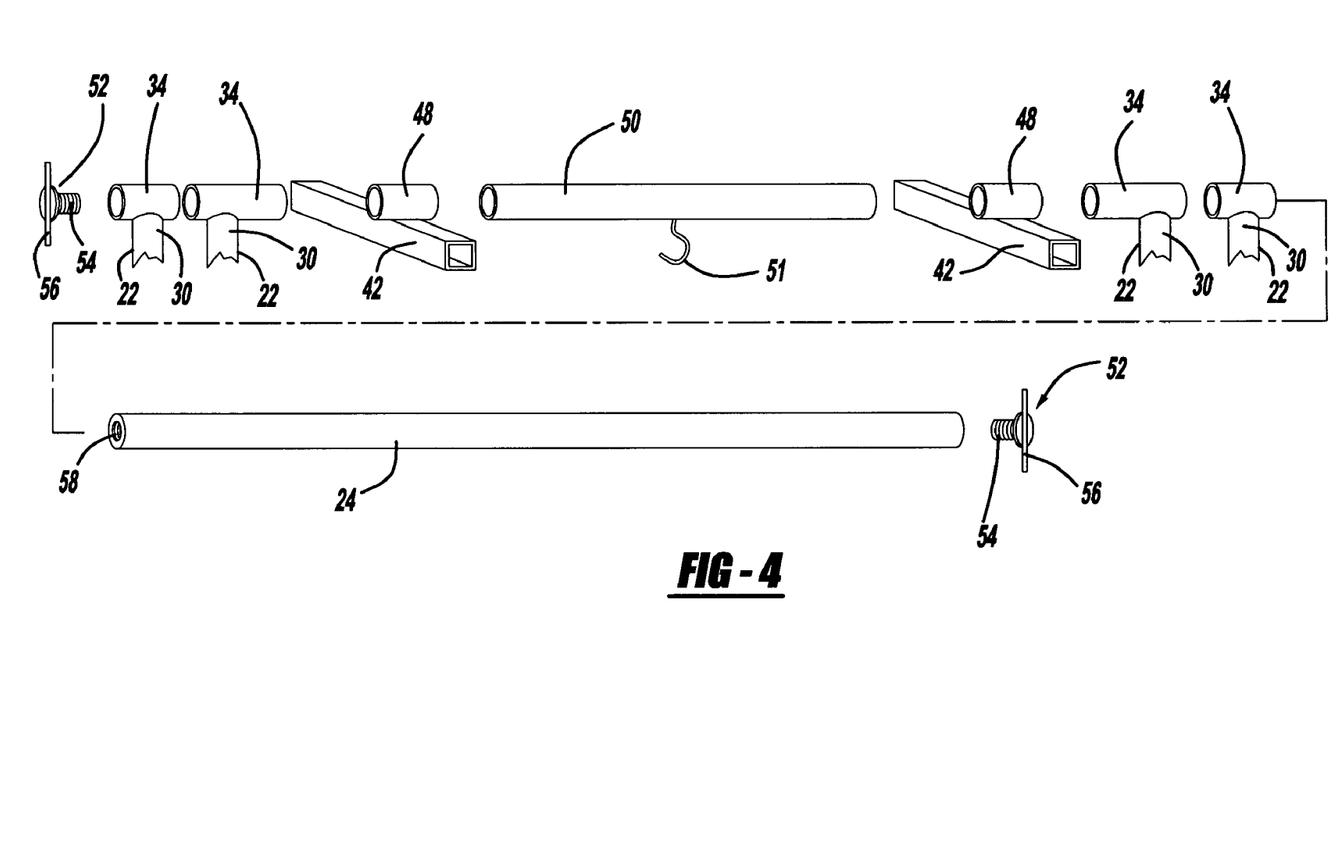
FIG. 4 is an exploded, broken perspective view illustrating assembly of a portion of the grill apparatus of FIG. 1 according to the present invention.

The frame 12 includes leg members 22 pivotally secured to a center support rod 24 clearly shown in FIG. 4. Each leg member 22 include leg sections 26, 28 which fit together to form the leg member 22. The ability to separate the leg member 22 into individual leg sections 26, 28 assists in the portability and collapsibility of the frame 12. Accordingly, other leg configurations such as telescopically extendable or foldable leg members are also suitable for use with the present invention. Each leg member 22 has a ground engaging end 30 and a mounting end 32. A sleeve 34 is attached to the mounting end 32 of the leg member 22. The sleeve 34 is of a size and diameter wherein it fits over the center support rod 24 such that the leg member 22, when placed on the center support rod 24, pivots or rotates about the center support rod 24.

As shown in the preferred embodiment, a pair of leg members, seen generally at 23, are mounted to the center support rod 24 at opposite ends thereof. A connecting member 36 extends between each of the leg members 22 forming the pair of leg members 23. The connecting member 36 operates to limit the relative pivoting of the leg members 22 with respect to one another. Thus, while the pair of leg members 23 may rotate together on the center support rod 24, the degree of relative rotation or the distance between the respective leg members 22 is limited by the connecting member 36. Securing the leg members 22 to the center support rod 24 in this manner provides a mechanism to adequately support the center support rod 24 on a variety of surfaces, including sloped or uneven terrain.

Figure 2:
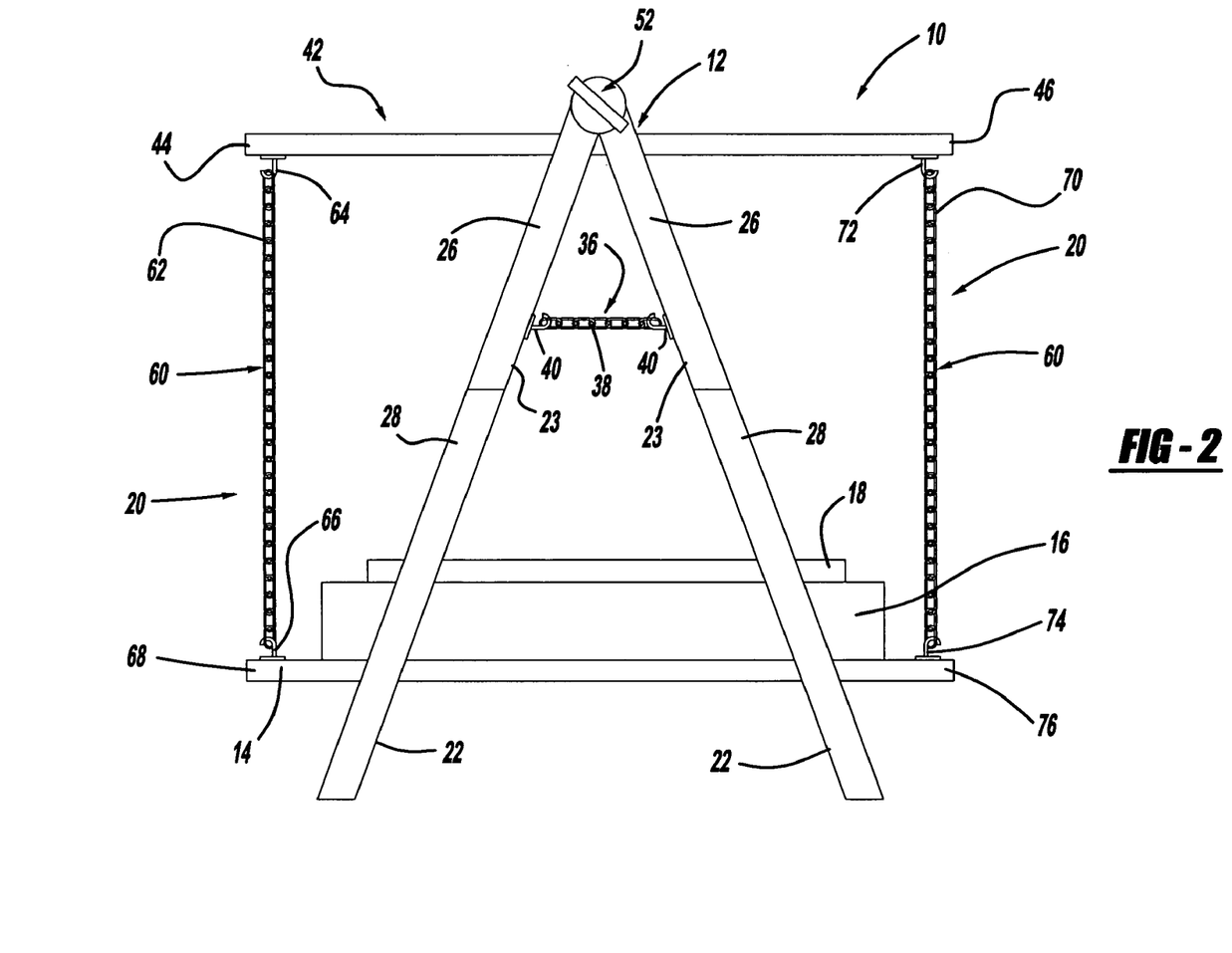
FIG. 2 is a side view of the grill apparatus according to the preferred embodiment of the present invention.

As illustrated in FIG. 2, the connecting member 36 may include a chain 38 connected to hooks 40 located on the leg members 22. The chain 38 provides both a portability and an adjustability feature; specifically, the chain 38 is easily removed from the hooks 40 when the portable grill apparatus 10 is disassembled for transport. Additionally, the distance between the respective leg members 22 may vary depending upon the length of the chain 38 or the particular link of the chain 38 connected to the hook 40.

The frame 12 further includes arm members 42 pivotally secured to the center support rod 24. Each arm member 42 having first and second ends 44, 46 extending outwardly from the center support rod 24. A sleeve 48 is attached to each arm member 42 at the midpoint of the arm member 42. The sleeve 48 is of a size and diameter wherein it fits over the center support rod 24 such that the arm member 42, when placed on the center support rod 24, may pivot or rotate about the center support rod 24. Placing the sleeve 48 at the midpoint of the arm member 42 balances the arm member 42 on the center support rod 24. Thus, absent a force applied to either the first or second ends 44, 46 of the arm member 42, the arm member 42 should remain stationary on the center support rod 24.

The frame 12 further includes a center sleeve 50 of a size and diameter wherein it fits over the center support rod 24. The primary function of the center sleeve 50, as shown in FIG. 4, is to act as a spacer to properly position the respective arm members 42 on the center support rod 24. A hook 51 may be placed on the center sleeve 50. Accordingly, a cooking utensil may be hung or suspended from the hook 51. Finally, a pair of locking members 52 are used to secure the leg members 22, arm members 42 and center sleeve 50 on the center support rod 24. Each of the locking members 52 include a threaded portion 54 and a handle 56. Wherein the threaded portion 54 engages a complementary set of internal threads 58 located on each end of the center support rod 24.

Figure 3:
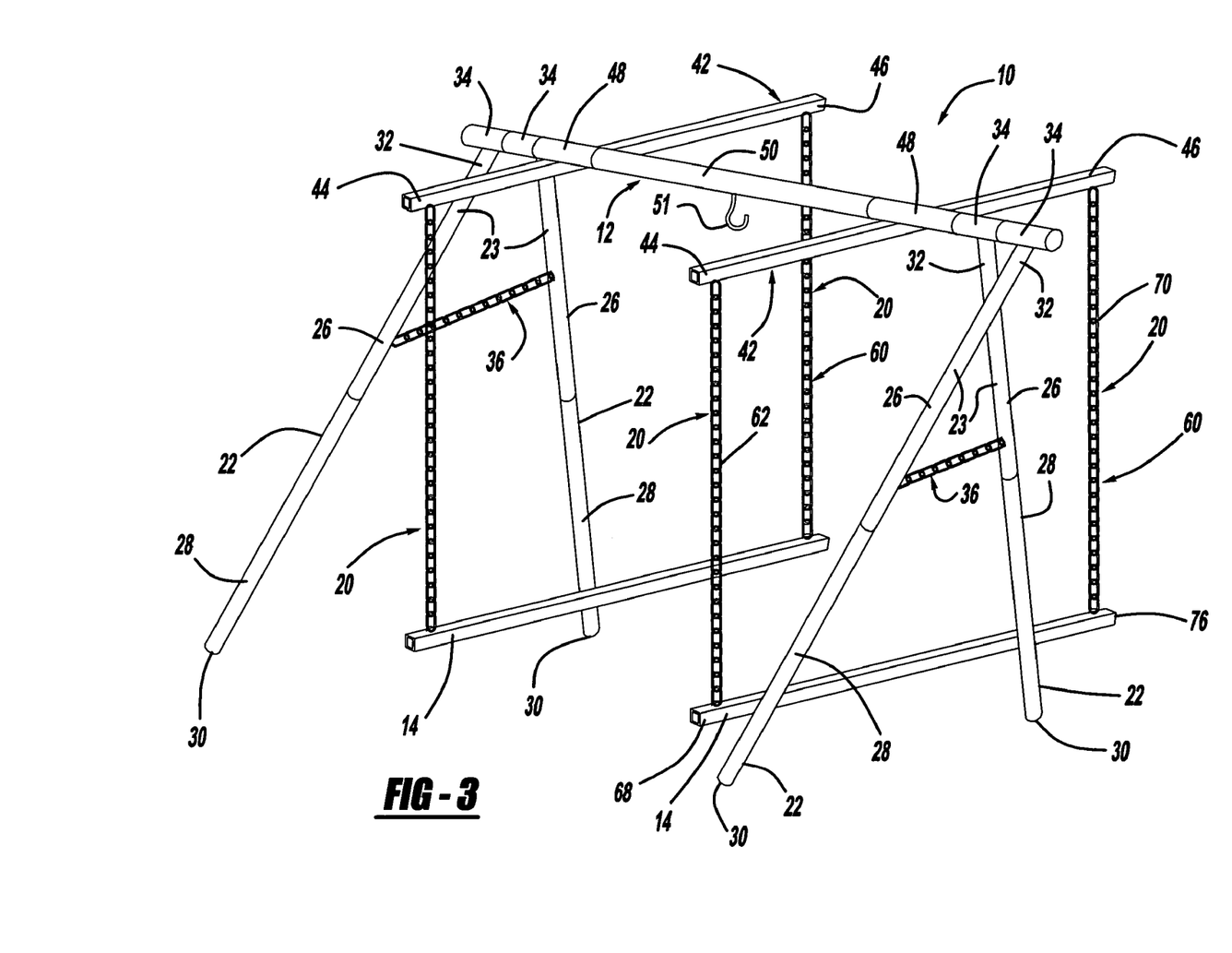
FIG. 3 is a perspective view of a portable grill apparatus according to the present invention with portions removed for clarity.

As illustrated in FIGS. 1–3, the suspension members 20 may include a plurality of chains 60, formed of a plurality of interconnected link members. To suspend the rail members 14 from the arm member 42, one end of a first chain 62 is attached to a hook 64 located on the first end 44 of the arm member 42. The other end of the first chain 62 is attached to a hook 66 located on a first end 68 of the rail member 14. Further, one end of a second chain 70 is attached to a hook 72 located on the second end 46 of the arm member 42. The other end of the second chain 70 is attached to a hook 74 located on a second end 76 of the rail member 14. Accordingly, the respective distance between the arm member 42 and the rail member 14 may be adjusted by reducing the length of the first and second chains 62, 70. Adjustment may easily be accomplished by simply repositioning the hooks 66, 74 located on the rail member 14 to a different link of the first and second chains 62, 70. Further, the respective distance between an arm member 42 and rail member 14 located on one side of the center support rod 24 may be adjusted independently of the distance between an arm member 42 and rail member 14 located on the opposite side. In this way the distance between the arm member 42 and rail member 14 may vary between respective pairs of arm members 42 and rail members 14.

While the suspension members 20 are disclosed herein as a plurality of chains 60, this is for illustration purposes only. The present invention contemplates the use of other suspension members such as cables, link members or other tensile members all of which have an adjustment mechanism whereby the overall length thereof can be shortened or lengthened as necessary.

FIGS. 1–2 illustrate the portable grill apparatus 10 according to the present invention supporting a firebox 16. As shown, the firebox 16 is supported above the ground surface on the rail members 14. A grill 18 is placed on the firebox 16 and may be used for cooking purposes. In keeping with a main aspect of the invention, the arm members 42 pivot on the center support rod 24 to properly orient and maintain the firebox 16 in a substantially horizontal position. That is, when the portable grill apparatus 10 is placed or set up on sloped or uneven terrain, gravity will cause the arm members 42 to pivot such that the suspension members 20 hang straight down. Correspondingly the rail members 14, and the firebox 16 supported thereon, remain substantially horizontal in a fore and aft direction or in an axis parallel to the longitudinal axis of the arm members 42.

To further adjust and maintain the horizontal orientation of the firebox 16, the length of the plurality of chains 60, for example the first and second chains 62, 70 may be adjusted to maintain a horizontal orientation in a side to side or lateral direction or in an axis parallel to the longitudinal axis of the center support rod 24. Thus, the firebox 16, and correspondingly the grill 18 supported on the firebox 16, is adjustable in an up-and-down, fore and aft and side to side direction thus enabling the portable grill apparatus 10 to be used with or on any type of terrain.

Figure 5:
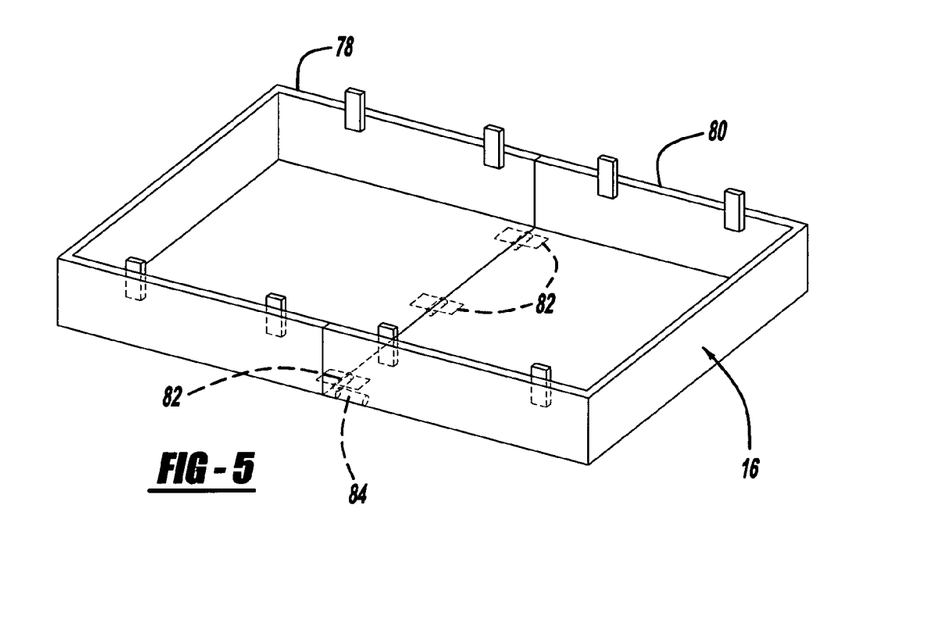
FIG. 5 is a perspective view of a firebox for use with one embodiment of the present invention.

Turning to FIG. 5, there is shown a firebox 16 according to one embodiment of the present invention. The firebox 16 is formed of first and second sections 78, 80 connected together using hinge members 82 having a retractable or removable hinge pin 84. In addition, the respective sides of the first and second sections 78, 80 may collapse to enable the firebox 16 to fold up in a compact manner. One purpose of the firebox 16 is to contain the cooking fire. Another is to support the grill 18.

Figure 6:
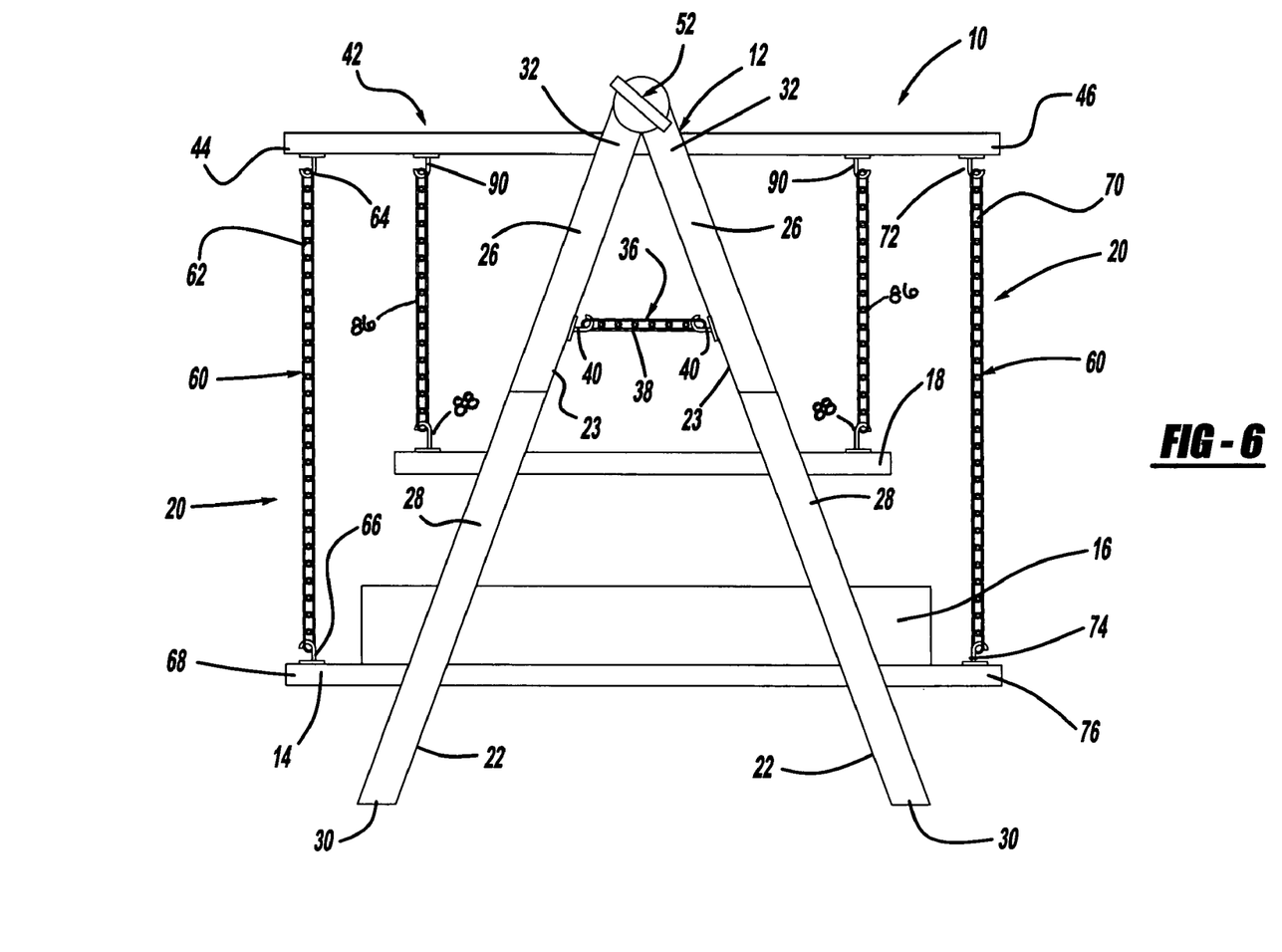
FIG. 6 is a side view of a portable grill apparatus illustrating another embodiment of the present invention.
Figure 7:
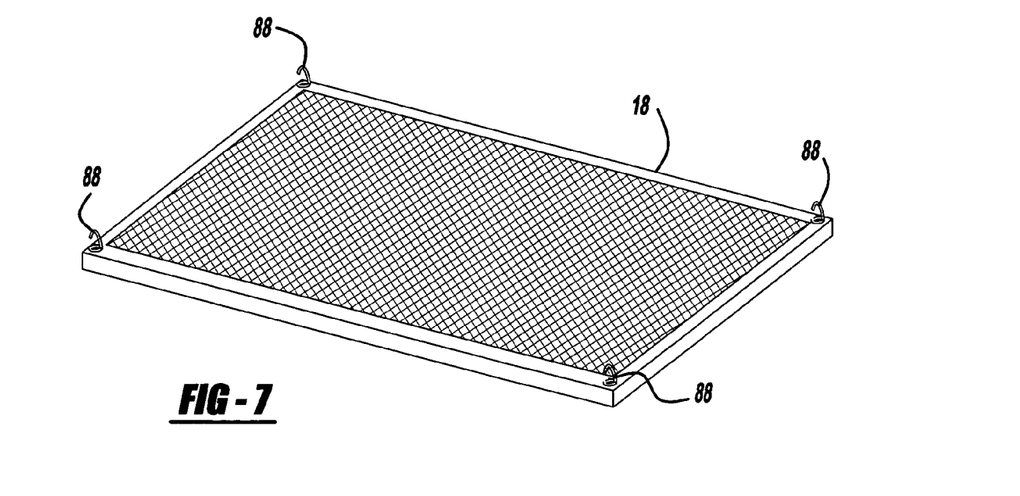
FIG. 7 is a perspective view of a grill used with the embodiment of the present invention illustrated in FIG. 6.

Turning now to the embodiment shown in FIGS. 6–7, the grill 18 includes a plurality of hooks 88 located at the corners thereof. The grill 18 is supported from the arm members 42 by a plurality of suspension members or chains 86 engaging the hooks 90 located on the arm members 42 and the plurality of hooks 88 on the grill 18. Accordingly, the height of the grill 18 with respect to the firebox 16 may be adjusted by varying the length of the chains 86 or by changing the position of the plurality of hooks 88, hooks 90 on the chains 86. In addition, the grill 18 will remain parallel to the firebox 16 in the fore and aft direction; i.e., in an axis parallel to the longitudinal axis of the arm members 42, whereby the side to side adjustment, or adjustment in the direction of the longitudinal axis of the center support rod 24, is made by adjusting the length of the chains 86 on one side of the grill 18.

Thus, the present invention provides an improvement over previous portable grills in that it provides a multi-axis adjustment feature which enables the firebox 16 to remain in a horizontal position irrespective of the ground surface or terrain upon which the portable grill apparatus 10 is placed.

While the present invention has been described in terms of a preferred embodiment, it is apparent that other forms could be adopted by one skilled in the art. In other words, the teachings of the present invention encompass any reasonable substitutions or equivalents of claim limitations. Accordingly, the scope of the present invention is to be limited only by the following claims.

What is claimed is:

1. A portable grill apparatus comprising:
   a cylindrical support rod having one end, an opposite end and a central axis;
   a plurality of leg members attached to said cylindrical support rod, each of said plurality of leg members having a mounting sleeve attached at one end thereof, said mounting sleeve co-axially disposed about said cylindrical support rod such that each of said leg members individually pivots about said cylindrical support rod;
   first and second arm members, each of said first and second arm members pivotally attached to said cylindrical support rod and extending outwardly therefrom on both sides of said cylindrical support rod;
   a grill adjustably suspended from said first and second arm members; and
   first and second rail members, each of said first and second rail members spaced away from a respective one of said first and second arm members, said first rail member suspended at each end thereof from said first arm member, said second rail member suspended at each end thereof from said second arm member whereby said first and second arm members pivot about said cylindrical support rod to adjust the orientation of each of said first and second rail members.

2. An apparatus as set forth in claim 1 further comprising:
   each of said first and second arm members having a first end and a second end;
   each of said first and second rail members having a first end and a second end;
   a sleeve located on each of said first and second arm members between said first and second ends thereof, said sleeve disposed on said cylindrical support rod; and
   a suspension member extending downward from each of said ends of said first and second arm members, said suspension member extending downward from said first end of each of said first and second arm members being connected to said first end of each of said first and second rail members, and said suspension member extending downward from said second end of each of said first and second arm members being connected to said second end of each of said first and second rail members.

3. An apparatus as set forth in claim 2 wherein each said suspension member includes a length adjustment mechanism.

4. An apparatus as set forth in claim 2 wherein each said suspension member includes a length of chain formed of a plurality of interconnected link members; and
   hooks located at each of said first and second ends of each of said first and second arm members and at said first and second ends of each of said first and second rail members, said hooks operative to engage an individual link of said chain whereby the spacing between said first and second ends of each of said first and second arm members and respective first and second ends of each of said first and second rail members may be adjusted depending upon the relative length of said chain between said first and second arm members and said first and second rail members.

5. An apparatus as set forth in claim 2 further comprising a firebox supported on said first and second rail members.

6. An apparatus as set forth in claim 1 wherein said grill is suspended from said first and second arm members by a plurality of chains, said plurality of chains connected to said first and second arm members and to said grill, the length of said chains being adjustable to adjust the position and orientation of said grill.

7. A portable grill apparatus comprising:
a cylindrical support rod having one end, an opposite end and a central axis;
a plurality of leg members attached to said cylindrical support rod, each of said plurality of leg members having a mounting sleeve attached at one end thereof, said mounting sleeve co-axially disposed about said cylindrical support rod such that each of said leg members individually pivots about said cylindrical support rod;
first and second arm members, each of said arm members pivotally connected to said cylindrical support rod;
first and second rail members, said first rail member suspended at each end thereof from said first arm member and said second rail member suspended at each end thereof from said second arm member; and
a firebox supported by said first and second rail members.

8. An apparatus as set forth in claim 7 wherein said first rail member and second rail member are suspended from a respective one of said first and second arm members by a plurality of chain members, each of said chain members formed of a plurality of interconnected link members, each of said chain members having first and second ends engaging hooks located on respective ends of said first and second arm members and on respective ends of said first and second rail members wherein the spacing between said first and second arm members and respective first and second rail members varies depending upon the length of said chain extending between said arm members and said rail members.

9. An apparatus as set forth in claim 7 further comprising a grill suspended from said first and second arm members.

10. An apparatus as set forth in claim 9 wherein said grill includes a plurality of hooks located adjacent the edges thereof, wherein said grill is suspended from said first and second arm members by a plurality of chains, formed of a plurality of interconnected link members, each of said plurality of chains being connected at one end thereof to one of said plurality of hooks located adjacent the edges of said grill and at the opposite end thereof to each of said first and second arm members, such that the position of said grill relative to said arm members is adjustable depending upon the particular link member of said chain engaged by said hooks.

11. An apparatus as set forth in claim 7 further comprising at least two leg members of said plurality of leg members located at one end of said cylindrical support rod and at least two additional leg members of said plurality of leg members are located at an opposite end of said cylindrical support rod, each of said leg members having a sleeve attached at one end thereof, said sleeve co-axially disposed over said cylindrical support rod such that each of said leg members individually pivots about said cylindrical support rod; and
a first connecting member extending between and connecting each of said at least two leg members located at one end of said cylindrical support rod and a second connecting member extending between and connecting each of said at least two additional leg members located at an opposite end of said cylindrical support rod, said first and second connecting members operative to limit the distance between said leg members.

12. An apparatus as set forth in claim 7 wherein said first and second arm members each include a sleeve attached thereto between first and second ends of each of said first and second arm members, said sleeve of each of said first and second arm members disposed on said cylindrical support rod.

13. A portable grill as set forth in claim 7
wherein said plurality of leg members further comprises at least four leg members, each of said leg members having a ground engaging end and a mounting end;
wherein each of said arm members have a sleeve attached thereto at a point between a first end and a second end of each of said arm members, each of said sleeves attached to said arm members co-axially disposed on said cylindrical support rod such that said arm members individually pivot about said cylindrical support rod, each of said arm members placed on said cylindrical support rod between said leg members pivotally attached to said cylindrical support rod at each end thereof;
a center sleeve positioned on said cylindrical support rod, said center sleeve placed between said sleeves of said arm members; and
a pair of locking members, each of said locking members engaging an end of said cylindrical support rod and retaining said sleeves of each of said leg members and said arm members along with said center sleeve on said cylindrical support rod.

14. A portable grill as set forth in claim 13 wherein said center sleeve has a hook attached thereto.

15. A portable, adjustable grill apparatus comprising:
a support rod;
a center sleeve located on said support rod;
a pair of arm members, each of said arm members including a sleeve attached thereto, said sleeve co-axially disposed on said support rod such that said arm members individually pivot about said support rod and are placed adjacent to and on opposite sides of said center sleeve;
a pair of rail members spaced from said pair of arm members;
adjustable suspension means for connecting said pair of rail members to said adjustable suspension means for connecting said pair of rail members to said pair of arm members;
a plurality of leg members, each of said leg members including a ground engaging end and a mounting end, a mounting sleeve attached to said mounting end of each of said plurality of leg members, said sleeves of said plurality of leg members co-axially disposed on said support rod such that each of said leg members individually pivot about said support rod, at least one of said sleeves of said leg members is placed adjacent to one of said sleeves of said arm members located on opposite sides of said center sleeve;
a firebox supported on said pair of rail members; and
locking members located on each end of said support rod, said locking members retaining said sleeves of said leg members located at the respective ends of said support rod on said support rod.

16. An apparatus as set forth in claim 15 further comprising a grill supported on a said firebox.

17. An apparatus as set forth in claim 15 further comprising a grill suspended from said pair of arm members.

* * * * *